(12) United States Patent
Walker et al.

(10) Patent No.: US 9,551,429 B2
(45) Date of Patent: Jan. 24, 2017

(54) RUPTURE DISC HAVING LASER-DEFINED REVERSAL INITIATION AND DEFORMATION CONTROL FEATURES

(75) Inventors: Joseph A. Walker, Kansas City, MO (US); Tom Farrell, Lawrence, KS (US)

(73) Assignee: FIKE CORPORATION, Blue Springs, MO (US)

( * ) Notice: Subject to any disclaimer, the term of this patent is extended or adjusted under 35 U.S.C. 154(b) by 0 days.

(21) Appl. No.: 13/552,165

(22) Filed: Jul. 18, 2012

(65) Prior Publication Data

US 2014/0021203 A1 Jan. 23, 2014

(51) Int. Cl.
*B65D 90/36* (2006.01)
*F16K 17/16* (2006.01)
*B65D 90/34* (2006.01)

(52) U.S. Cl.
CPC ................ *F16K 17/1606* (2013.01)

(58) Field of Classification Search
CPC ............... F16K 17/16; F16K 17/1606
USPC ................... 220/89.2, 89.1, 203.08
See application file for complete search history.

(56) References Cited

U.S. PATENT DOCUMENTS

| | | | |
|---|---|---|---|
| 4,588,101 A | 5/1986 | Ruegg | |
| 4,803,136 A * | 2/1989 | Bowsky et al. | 429/56 |
| 5,042,675 A | 8/1991 | Patterson | |
| 5,996,605 A * | 12/1999 | Farwell | 137/68.21 |
| 6,321,582 B1 | 11/2001 | Cullinane et al. | |
| 6,357,792 B1 | 3/2002 | Shirk et al. | |
| 6,431,383 B1 * | 8/2002 | Mozley et al. | 220/89.1 |
| 6,494,074 B2 | 12/2002 | Cullinane et al. | |
| 6,959,828 B2 * | 11/2005 | Eijkelenberg et al. | 220/89.2 |
| 7,600,527 B2 | 10/2009 | Shaw et al. | |
| 2006/0169319 A1 * | 8/2006 | Rooker et al. | 137/68.29 |
| 2006/0237457 A1 * | 10/2006 | Shaw et al. | 220/89.2 |
| 2008/0060702 A1 * | 3/2008 | Muddiman | 137/68.27 |
| 2008/0202595 A1 * | 8/2008 | Melrose et al. | 137/68.23 |
| 2009/0302035 A1 * | 12/2009 | Shaw et al. | 220/89.2 |
| 2010/0140238 A1 | 6/2010 | Mozley et al. | |
| 2010/0140264 A1 * | 6/2010 | Hernandez | 220/89.2 |

(Continued)

FOREIGN PATENT DOCUMENTS

| | | |
|---|---|---|
| CA | 1304650 | 7/1992 |
| GB | 2003061 | 3/1979 |

(Continued)

OTHER PUBLICATIONS

International Search Report and Written Opinion dated Oct. 16, 2013, in the PCT/US2013/050096 filed on Jul. 11, 2013.

(Continued)

*Primary Examiner* — J. Gregory Pickett
*Assistant Examiner* — Niki M Eloshway
(74) *Attorney, Agent, or Firm* — Hovey Williams LLP

(57) ABSTRACT

A reverse-acting rupture disc (10) having a laser-defined reversal initiation feature (16) is provided in the bulged section (12) of the disc. The reversal initiation feature comprises at least a first lased area (22) that has a reduced thickness relative to rest of the bulged section. A second lased area (24) may also be provided within the margins of the first lased area. The second lased area has a depth that is greater than the depth of the first lased area. A line of weakness (40) may be formed in the bulged section that functions to direct reversal of the bulged section toward a particular area of the disc, such as line-of-opening recess (56).

48 Claims, 9 Drawing Sheets

(56) References Cited

U.S. PATENT DOCUMENTS

2010/0224603 A1* 9/2010 Modena et al. ......... 219/121.72

FOREIGN PATENT DOCUMENTS

| JP | 11043008 | 10/2009 |
|---|---|---|
| WO | 2008/011132 | 1/2008 |

OTHER PUBLICATIONS

International Search Report dated Apr. 11, 2016, in the PCT/US2013/050096 filed on Jul. 11, 2013.
Third Party Observations dated Dec. 14, 2015, in the PCT/US2013/050096 filed on Jul. 11, 2013.

* cited by examiner

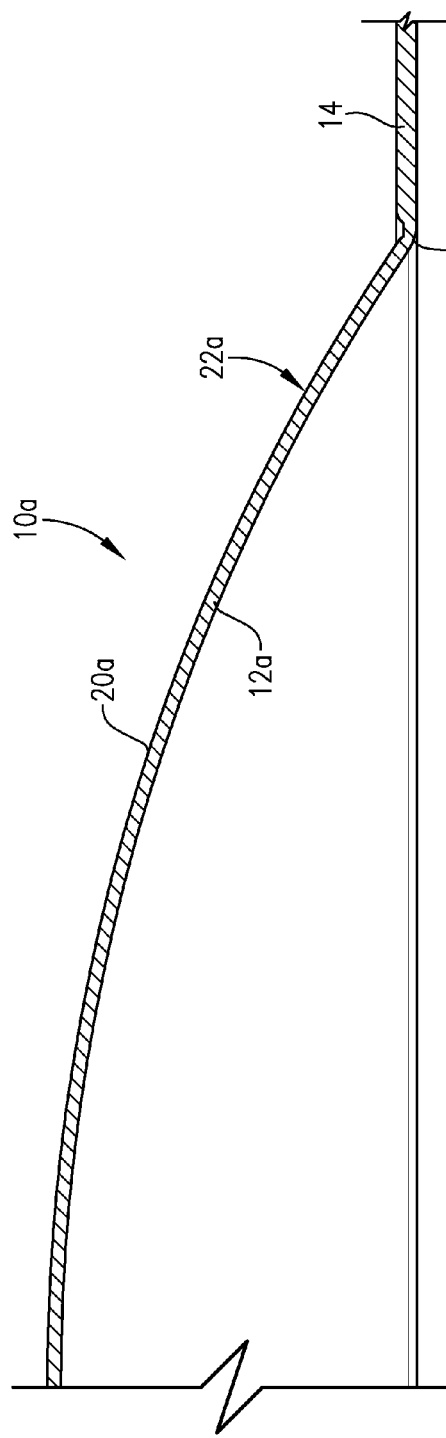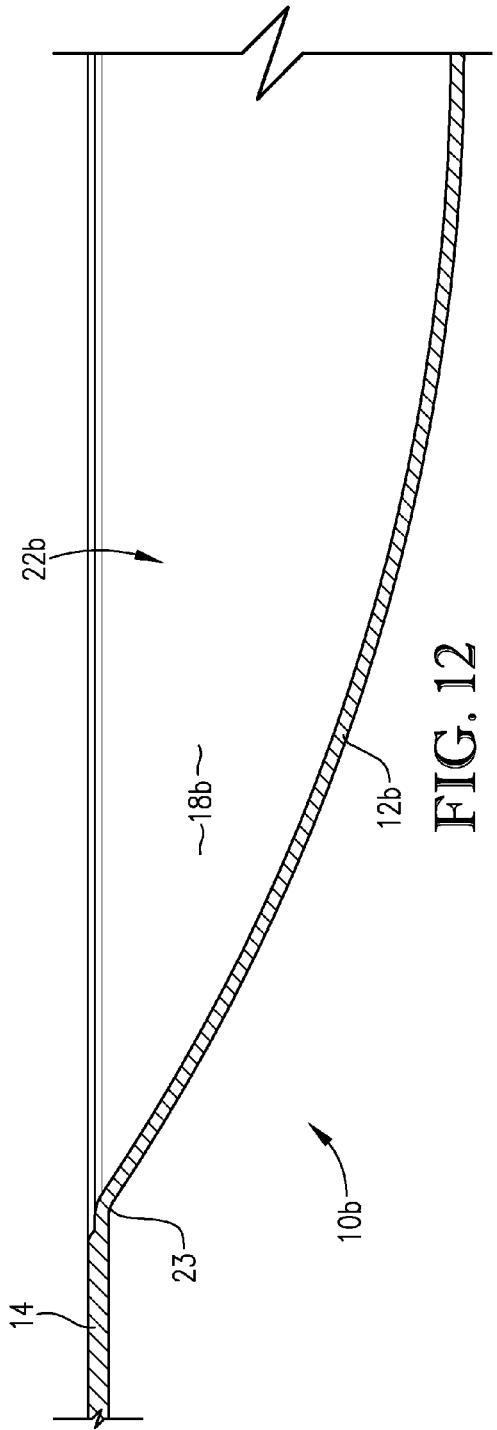

RUPTURE DISC HAVING LASER-DEFINED REVERSAL INITIATION AND DEFORMATION CONTROL FEATURES

BACKGROUND OF THE INVENTION

Field of the Invention

The present invention is generally directed toward reverse-buckling rupture discs having reversal initiation and deformation control features on the domed portions thereof formed by laser removal of metal from the disc. The reversal initiation and deformation control features provide for exceptional control over the opening characteristics of the disc, particularly the pressure at which disc reversal is initiated, the direction in which the reversal traverses the domed portion of the disc, and the shape formed by the petal upon rupture.

Description of the Prior Art

Reverse-acting rupture discs have been employed as safety devices in process equipment where relatively low overpressure conditions, such as 7 to 10 psig, and relatively high overpressure conditions, such as 600 psig, may be encountered. While it is conventional to employ reverse-buckling rupture discs for low pressure applications, it has been found difficult to provide narrow range burst pressure tolerances at low pressures. In order to achieve reliable disc rupture at low differential pressures, disc manufacturers have incorporated structures onto the disc to provide a weakened area at which dome reversal begins under pressure conditions much lower than those required if the dome had not been intentionally weakened.

Control of the progression of the reversal event has been shown to be desirable in facilitating optimization of opening characteristics—e.g. achieving full opening under low-energy conditions, and preventing fragmentation under high-energy conditions. In addition, with proper control the energy embodied in the reversal and opening event may be used to optimize flow characteristics of the opened rupture disc. It is thus desirable to embody such control in a rupture disc design.

Toward that end, reversal initiation features (RIFs) have been incorporated into the rupture disc design, typically in the center of the dome or offset slightly away or toward from the tooth side of the dome (with reference to the tooth structure of a disc support ring positioned adjacent to the disc), so that the reversal will proceed from the RIF across the dome in a fairly balanced manner, gathering energy until the tooth is engaged.

In the past, some rupture disc designs have accomplished reversal control by using score lines as RIF's. Another structure that has been utilized previously in reversal initiation and thus burst pressure control is a dimple or other indentation formed in the dome of the rupture disc. This indentation is strategically located in a position such that the domed part of the disc will fail first at the area of depression. U.S. Pat. No. 6,494,074 discloses discs bearing indentations in the domed portion and methods of creating the indentations through mechanical deformation of the dome.

U.S. Pat. No. 6,945,420 discloses the creation of a segment in the dome of the disc having an altered metallic grain structure. Particularly, during pre-bulging of the disc blank, a portion of what will become the domed area of the disc is deflected by a post. Following this initial deflection, the post is removed and the pre-bulged disc undergoes final bulging to form the finished rupture disc. During final bulging, the indentation previously formed during the pre-bulging step is returned to its initial position with respect to the remainder of the disc body prior to formation of the indentation by the deflection post. As a result, the convex and concave portions of the disc are smooth and free of projecting surfaces or depressions. The act of creating and reversing the indentation forms a work-hardened segment in the dome of the disc having a higher residual stress than the remainder of the final bulged section. Upon encountering an overpressure condition of sufficient magnitude, the bulged portion of the disc begins to reverse at this work-hardened segment. It was discovered that altering the grain structure of a portion of the dome is effective in providing a wide range of burst pressures for a given disc thickness, particularly when the disc is formed of 316 stainless steel. However, with different metals and metal alloys, the same breadth of burst pressure range is not always observed due to the inherent crystallographic characteristics of the material.

International Patent Application Publication WO 2008/155783 discloses the use of a laser to create a region of deformation initiation. In one embodiment, the region of deformation initiation is an indentation created by heating a portion of the disc's dome and permanent set by gravity, radiation pressure, punches or other techniques. Alternatively, the region of deformation initiation is made by modification of the crystalline metallurgic structure due to the thermal variation induced by laser radiation.

U.S. patent application Ser. No. 12/331,611 describes creation of one or more non-rupturing "control scores" that together control reversal initiation. These "control scores" are positioned somewhere between the apex and the periphery of the dome, but do not proceed across the center of the dome, and are not designed to guide the deformation of the disk into an optimal shape both during and after the reversal and opening of the disc. These "control scores" are also differentiated from "rupture scores", they are intended to not be part of the opening of the disc.

A particular problem encountered on reverse acting rupture discs of a single-petal type is the formation of a "cup" shape by the petal after rupture in liquid opening situations. The energy released during the opening event is generally very much lower than that involved in a gas-only pressure relief situation, and is not always adequate to flatten the petal back against the outlet, instead leaving the petal in the cup shape formed during the reversal. This cup shape, in turn, leads to less-desirable flow values for the rupture disc. It is therefore desirable to include functionality within the disc features that can lead to flattening of the petal, even in low-energy opening events.

SUMMARY OF THE INVENTION

During disc reversal, the shape of the reversed portion of the dome generally approximates a regular polygon of 4, 5, or 6 sides and vertices. The growth of this reversal shape is somewhat chaotic. The polygon tends to rotate while its degree of regularity changes drastically, to the point that the number of vertices sometimes changes during the event. Embodiments of the present invention seek to control and regularize the growth of the reversal shape, so that the disc-opening tooth might be engaged by the desired part of that shape, thus leading to better optimization of opening characteristics.

According to one embodiment of the present invention an over-pressure relief device is provided comprising a reverse-acting rupture disc, and particularly a single-petal rupture disc. The rupture disc includes a central bulged section having a concave face and a convex face, and an outer flange section in surrounding relationship to the bulged section.

The bulged section includes a laser-defined feature that controls the pressure to which the rupture disc must be exposed in order to initiate reversal of the concavity of the bulged section, as well as controlling the way the disc material deforms, before, during and after rupture. This feature comprises lased areas located on the bulged section having net thicknesses that may vary from point to point, but are on average less than the thickness of the bulged section surrounding the lased area. The lased feature may include a first lased portion and a second lased portion, where at least a part of the second lased portion is located within the margins of the first lased portion, and has a depth that is greater than the depth of the first lased portion. In certain embodiments, the lased feature proceeds across the dome as a score line, widened at each end, the first of which is contiguous with a peripheral line of weakness (LoW) intended as an opening line, and the second end centered just to the opposite side of the apex of the dome.

According to another embodiment of the present invention an over-pressure relief device is provided comprising a reverse-acting rupture disc. Like the previous embodiment, the rupture disc includes a central bulged section having a concave face and a convex face, and an outer flange section in surrounding relationship to the bulged section. The bulged section also includes a laser-defined feature that controls the pressure to which the rupture disc must be exposed in order to initiate reversal of the concavity of the bulged section, as well as controlling the way the disc material deforms, both before and after rupture. This feature comprises a lased area located on the bulged section having a thickness that is less than the thickness of the bulged section surrounding the lased area. The lased area may fall across the center of the dome, but has a geometric center that is offset from the apex of the bulged section. This feature further includes a lased line of weakness that extends from the lased area toward the flange section, thereby improving control over disc opening by providing a path for guiding disc material deformation both during reversal and rupture, as well as after rupture.

According to still another embodiment of the present invention there is provided an over-pressure relief device comprising a bulged rupture disc in which a significant portion of at least one of the convex and concave faces has undergone laser milling in order to reduce the thickness of the disc material. A laser beam is passed over at least one face of the bulged section to produce a lased area. The lased area generally comprises at least 75% of the total surface area of the face in which it is formed. In other embodiments, the lased area comprises substantially all of at least one of the bulged section faces and may even extend onto a portion of the disc's outer flange section.

BRIEF DESCRIPTION OF THE DRAWINGS

FIG. 11 is a cross-sectional view of a rupture disc in which substantially the entire convex face has had disc material removed by laser machining; and FIG. 12 is a cross-section view of a rupture disc in which substantially the entire concave face has had disc material removed by laser machining.

DETAILED DESCRIPTION OF THE PREFERRED EMBODIMENT

The present invention is concerned with reversal initiation and deformation control features that provide wide-range burst pressure control over reverse-acting rupture discs of a given thickness. Particularly, the reversal initiation features are formed using laser-machining technology to remove material (e.g., metal) from the disc, such as through one or more ablation mechanisms, to form a weakened area where disc reversal commences, and through which reversal, rupture and petal formation progress.

Figure 1:
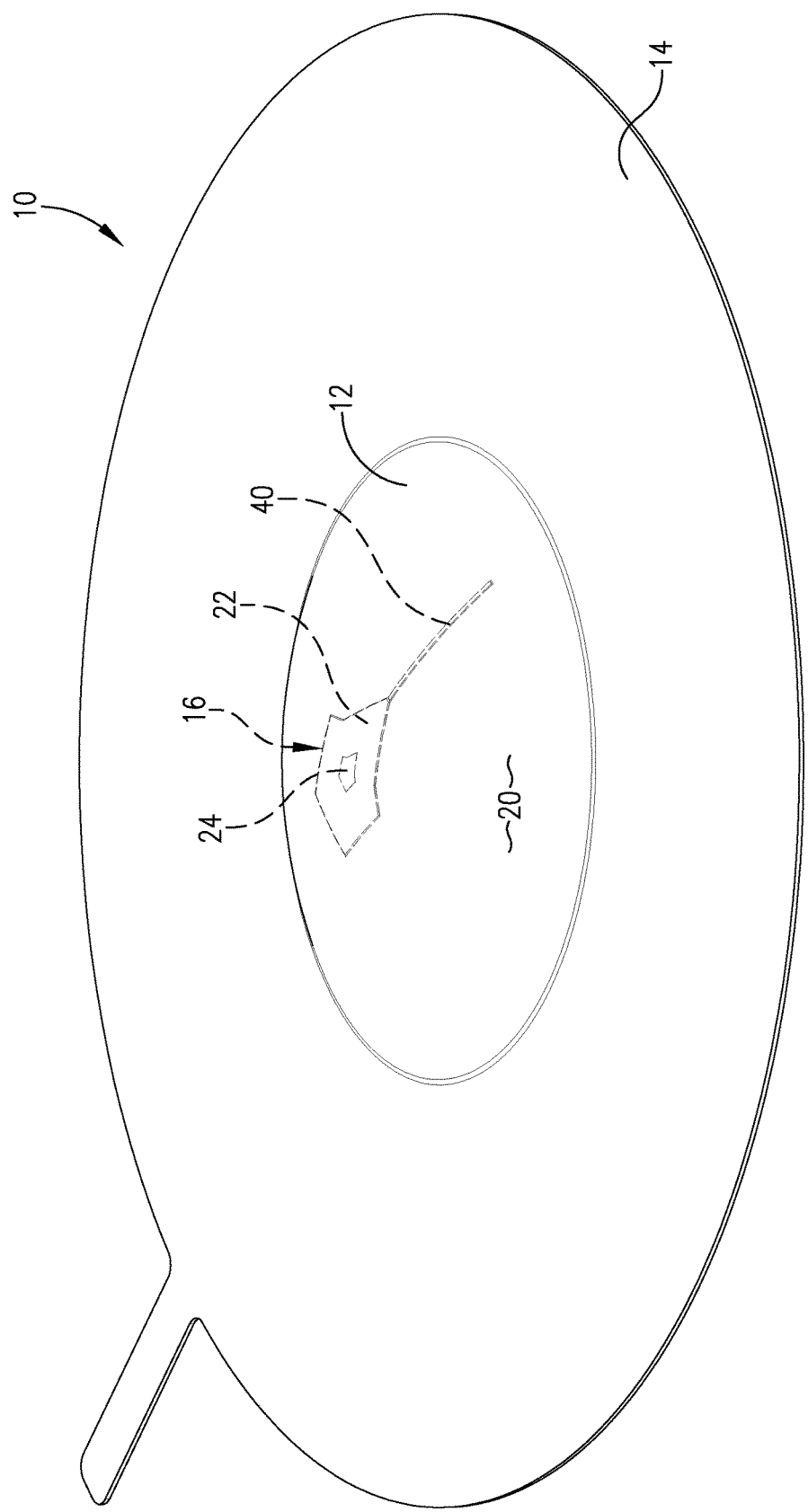
FIG. 1 is an isometric view of a reverse-acting rupture disc having a polygonal reversal initiation feature formed in the concave portion of the disc.
Figure 2:
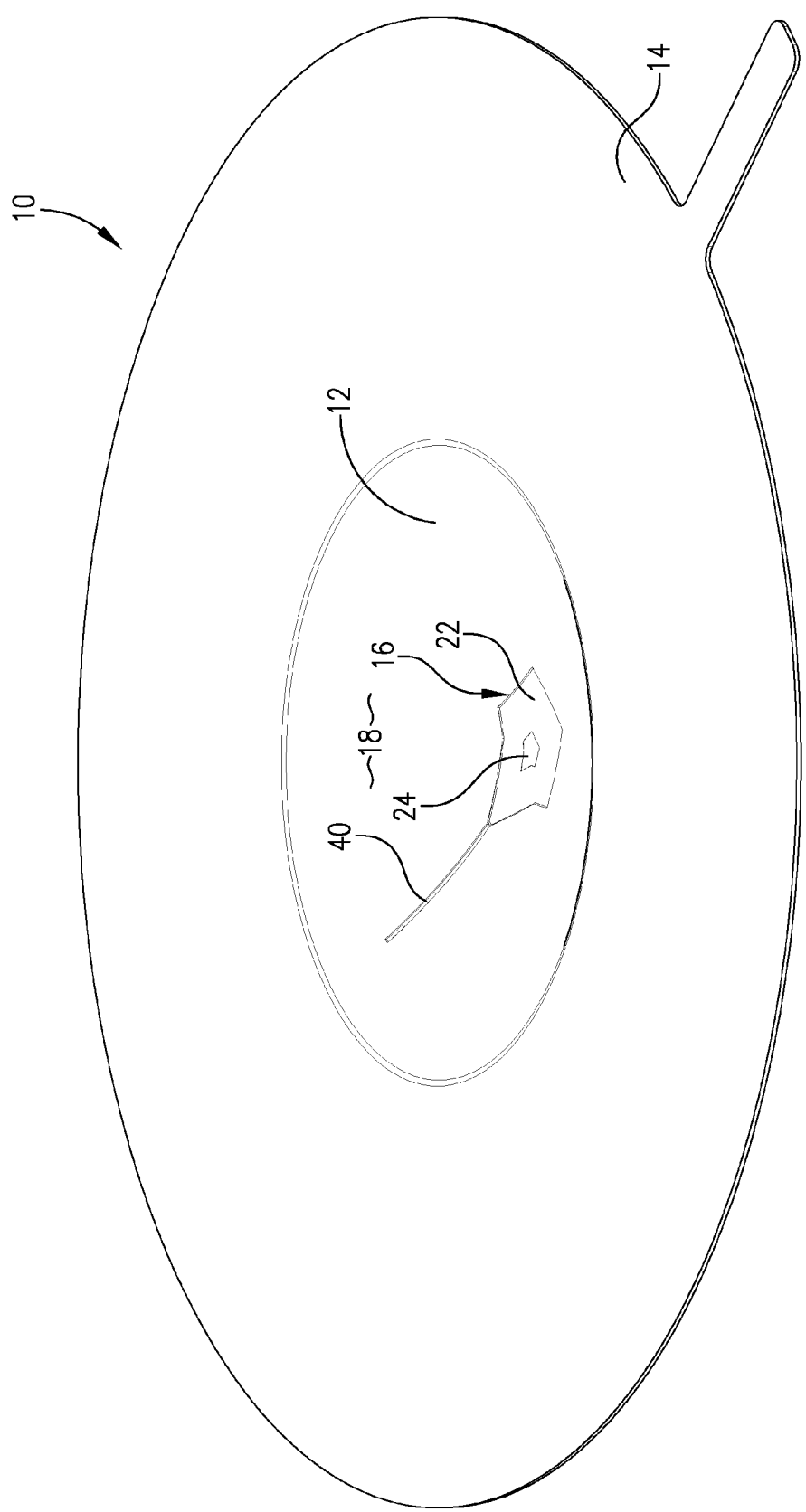
FIG. 2 is an alternate isometric view of the rupture disc of FIG. 1 showing the reversal initiation feature formed in the concave portion of the disc.

Turning to FIGS. 1 and 2, a reverse-acting rupture disc 10 is illustrated. Disc 10 includes a central bulged section or dome 12 and an outer, annular flange section 14. Disc 10 can be comprised of any material including various stainless steels, Hastalloy, Inconel, titanium, and nickel. A reversal initiation feature 16 is formed in the bulged section, particularly in the concave face 18 thereof. It is, however, within the scope of the present invention for feature 16 to also be formed in convex face 20, although, in certain embodiments, especially those for sanitary applications, it is preferable for feature 16 to be formed in concave face 18 as it is the convex face 20 that is exposed to the process fluids or materials within equipment being protected by disc 10. Convex face 20 exhibits a smooth surface free from indentations or other deformations that might otherwise accumulate matter and create unsanitary conditions.

Reversal initiation feature 16 generally comprises a first lased area 22 that is recessed from and has a reduced thickness as compared to the rest of bulged section 12 surrounding the lased area. This reduced thickness is readily observed in FIG. 4. The reversal initiation feature is created through the removal of metal from bulged section 12 by a laser. One of skill in the art is capable of selecting an appropriate laser and laser operating parameters depending upon numerous variables such as the disc material, disc thickness, and desired processing time. In certain embodiments, it is desirable to select a laser and laser operating parameters so as to avoid creation of heat affected zones within lased area 22 as this can lead to unpredictable disc reversal and opening characteristics. Thus, the grain structure of the metal within and adjacent to the lased area is substantially the same as the remainder of bulged section 12.

Figure 4:
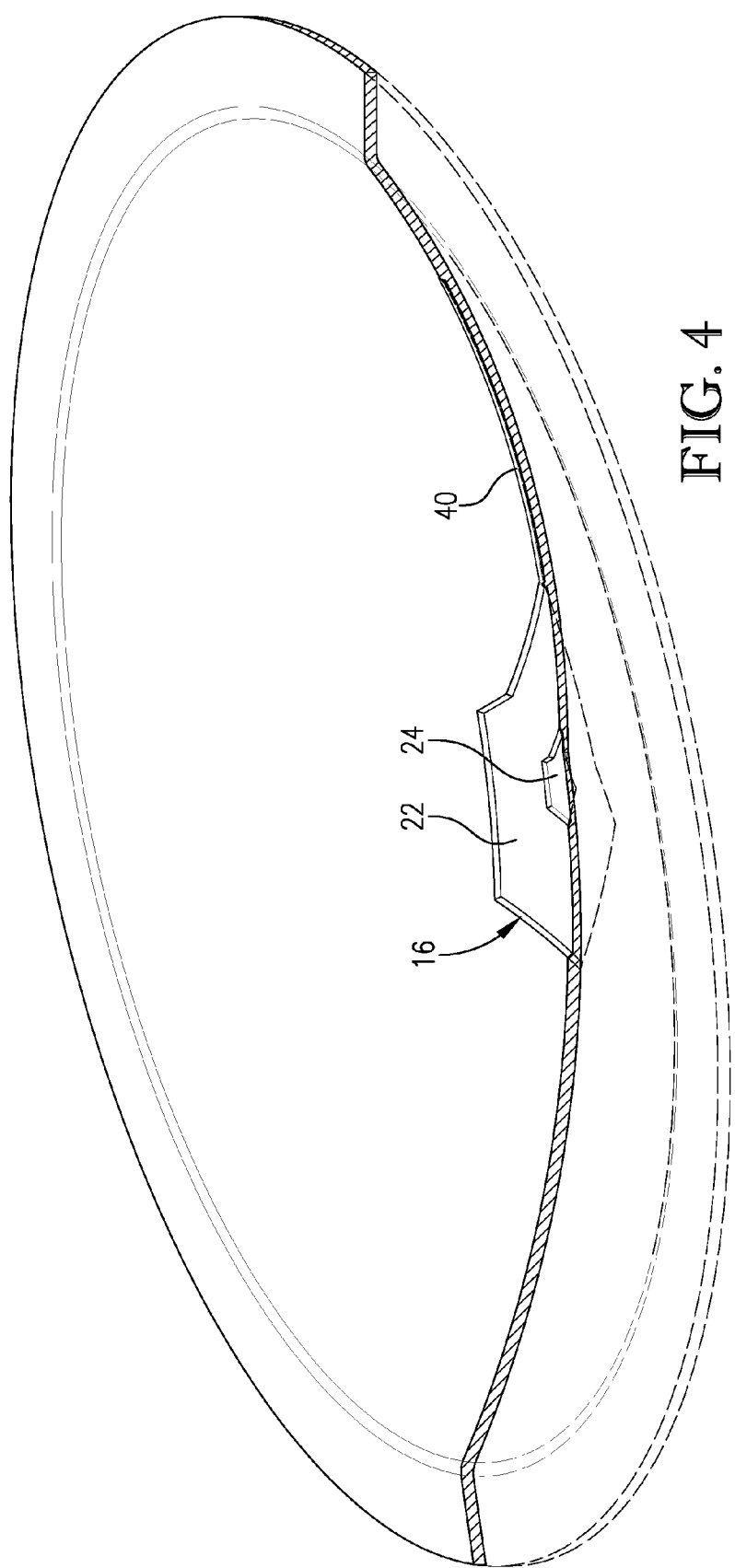
FIG. 4 is a cross-sectional view of the rupture disc of FIG. 3 taken along line 4-4.

In certain embodiments, reversal initiation feature 16 also comprises a second lased area 24 located within the margins of first lased area 22. As shown in FIG. 4, lased area 24 is recessed from and has a reduced thickness as compared to lased area 22. Lased area 24 provides an additional means of fine tuning control over the pressure at which bulged section 12 reverses than might otherwise be achieved through a reversal initiation feature having a single depth. While the scope of the present invention is not limited to any particular lased area depths or other relative dimensional ratios between lased areas 22 and 24, the relationship of these features can be illustrated through the following exemplary embodiments. Further, reversal initiation feature 16 may comprise a plurality of superposed lased areas the depth of which progressively increases from the periphery of feature 16 toward the center. The number of superposed lased areas may be great enough so that the precise transition between one lased area and the adjacent lased area may be difficult to perceive. Thus, the depth of the reversal initiation feature appears to smoothly progress toward the center. However, even in such embodiments, there will still be discernible lased regions of different depths.

In one exemplary embodiment, first lased area 22 has a thickness that is between about 5% to about 95%, between about 40% to about 90%, or between about 50% to about 80% of the thickness of the unaltered or non-lased disc material immediately surrounding the lased area. Second lased area 24 may have a thickness that is between about 1% to about 75%, between about 25% to about 70%, or between about 30% to about 60% of the thickness of the disc material immediately surrounding lased area 22.

The creation of second lased area 24 that is of greater depth than first lased area 22 also presents some advantages from a manufacturing standpoint. By forming second lased area 24, pinhole effects that may occur as a laser-milled feature approaches full through-lasing, due to the tendency of greater-depth trenches to appear at a lased area's periphery can be reduced or even eliminated. The smaller dimensions of second lased area 24 permit focusing of the laser beam away from the peripheral areas of first lased area 22 where these trenches would otherwise grow.

The area of the bulged section 12 that reversal initiation feature 16 occupies can also affect the level of control over bust pressure. In certain embodiments, reversal initiation feature 16 occupies between about 1.5% and about 7%, between about 2% to about 6%, or between about 3% and about 5% of the surface area of either convex face 20 or concave face 18, depending upon in which face feature 16 resides.

Figure 3:
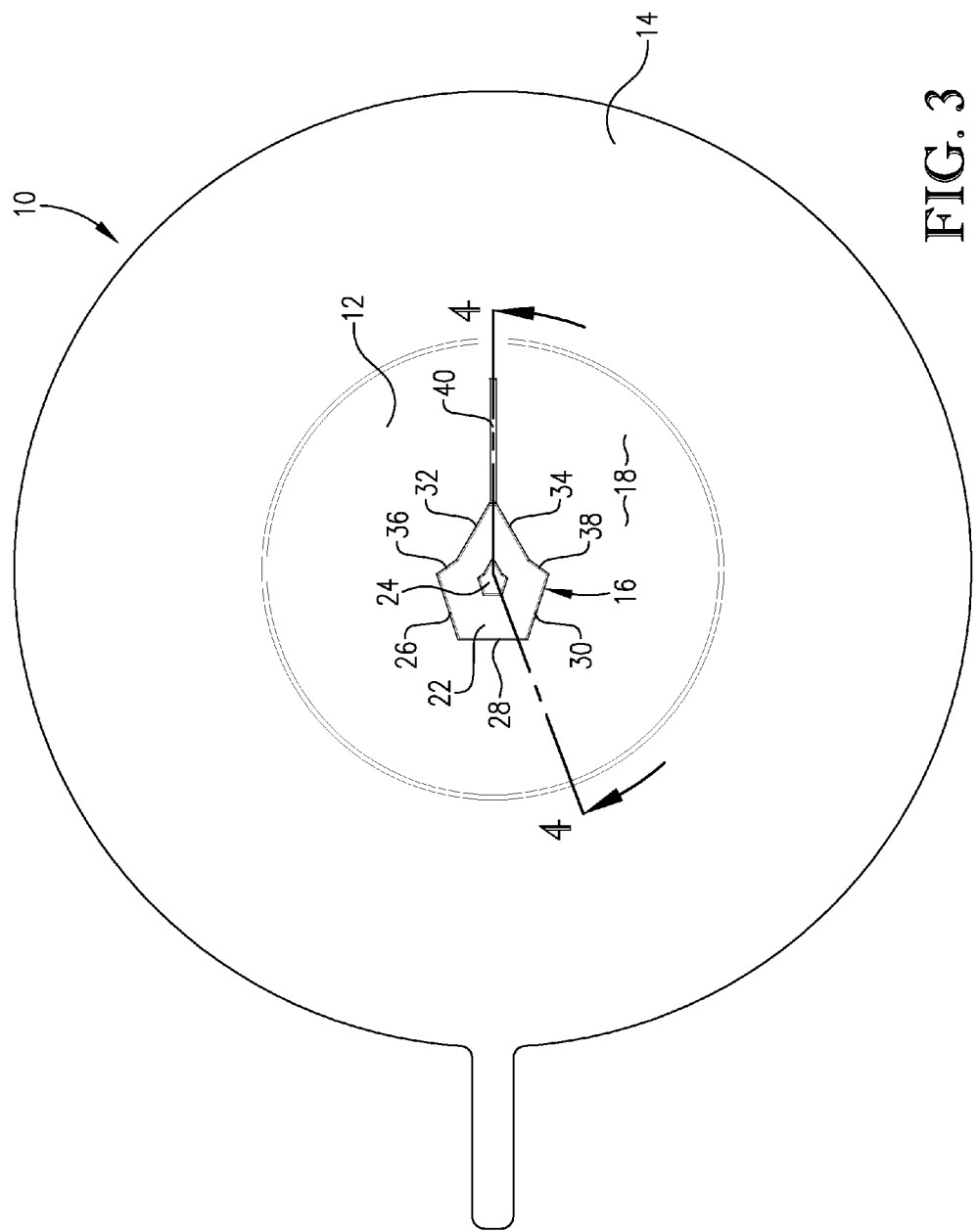
FIG. 3 is a plan view of the concave portion of the disc's bulged section showing the reversal initiation feature.

Reversal initiation feature 16 may take on any number of geometries. As illustrated in FIG. 3, first lased area 22 is a polygon, namely a heptagon, having five side margins (26, 28, 30, 32, and 34) of substantially equal length and two truncated side margins 36, 38.

Second lased area 24 comprises substantially the same shape, but is of smaller overall dimensions than first lased area 22. It is within the scope of the present invention, however, for lased areas 22 and 24 to be of different geometry.

Figure 8:
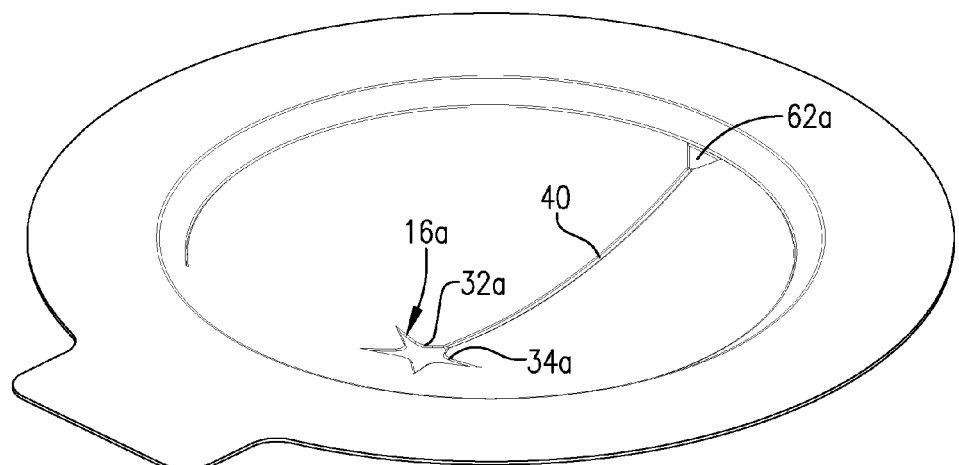
FIG. 8 is an isometric view of an alternate embodiment of a rupture disc according to the present invention, the rupture disc having a star-shaped reversal initiation feature formed in the concave portion of the disc.
Figure 9:
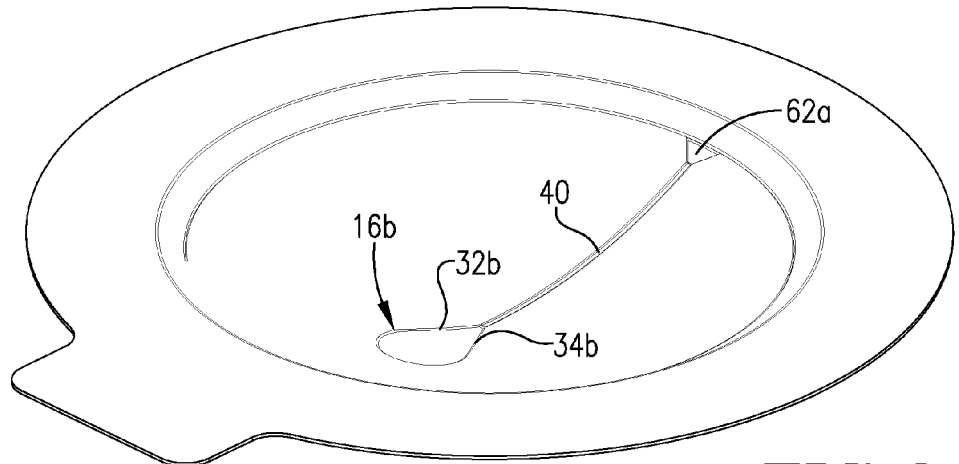
FIG. 9 is an isometric view of an alternate embodiment of a rupture disc according to the present invention, the rupture disc having a tear-shaped reversal initiation feature formed in the concave portion of the disc.

In certain embodiments, while lased area 22 extends over of the apex of bulged section 12, it has a geometric center that is offset therefrom. Placing reversal initiation feature 16 on the opposite side of bulged section 12 from tooth 54 of support ring 42 has been shown to improve control of the opening event as compared with placing the feature 16 at the apex of bulged section 12. This offsetting helps to create an imbalance on the bulged section leading to a wider degree of burst pressure control and improved opening behavior. In particular embodiments, lased area 24 is also offset from the apex of bulged section 12 further enhancing the imbalance created by lased area 22. FIGS. 8 and 9 illustrate further exemplary geometries for feature 16, such as a star pattern 16a and a teardrop pattern 16b. Note, it is within the scope of the present invention for feature 16 to comprise other polygonal and non-polygonal shapes, such as a triangle, square, rectangle, pentagon, hexagon, octagon, circle, crescent, or ellipse. The particular lased shape(s) chosen impacts the way the disc reverses and opens.

Certain embodiments of the invention also comprise a lased line of weakness 40 that extends from lased area 22 toward flange section 14. In some embodiments, line of weakness 40 may comprise a narrow channel or trench formed by removing additional metal from bulged section 12. The channel or trench may be continuous or interrupted.

In some embodiments, disc 10 is installed with a support ring 42. A tab 44 on rupture disc 10 may be placed in registry with a tab 46 on support ring 42 to ensure proper alignment of disc 10 and ring 42 during installation. Ring 42 is annular in configuration having a central opening 48. A hinge support member 50 extends inwardly into opening 48 and is configured to support the hinge region 52 of disc 10 and to prevent fragmentation of the petal formed upon opening of the disc. Ring 42 may also be provided with a tooth 54 that also extends inwardly into opening 48. Tooth 54 may also be slightly upturned so as to facilitate engagement with and opening of bulged section 12 upon reversal thereof.

Figure 5:
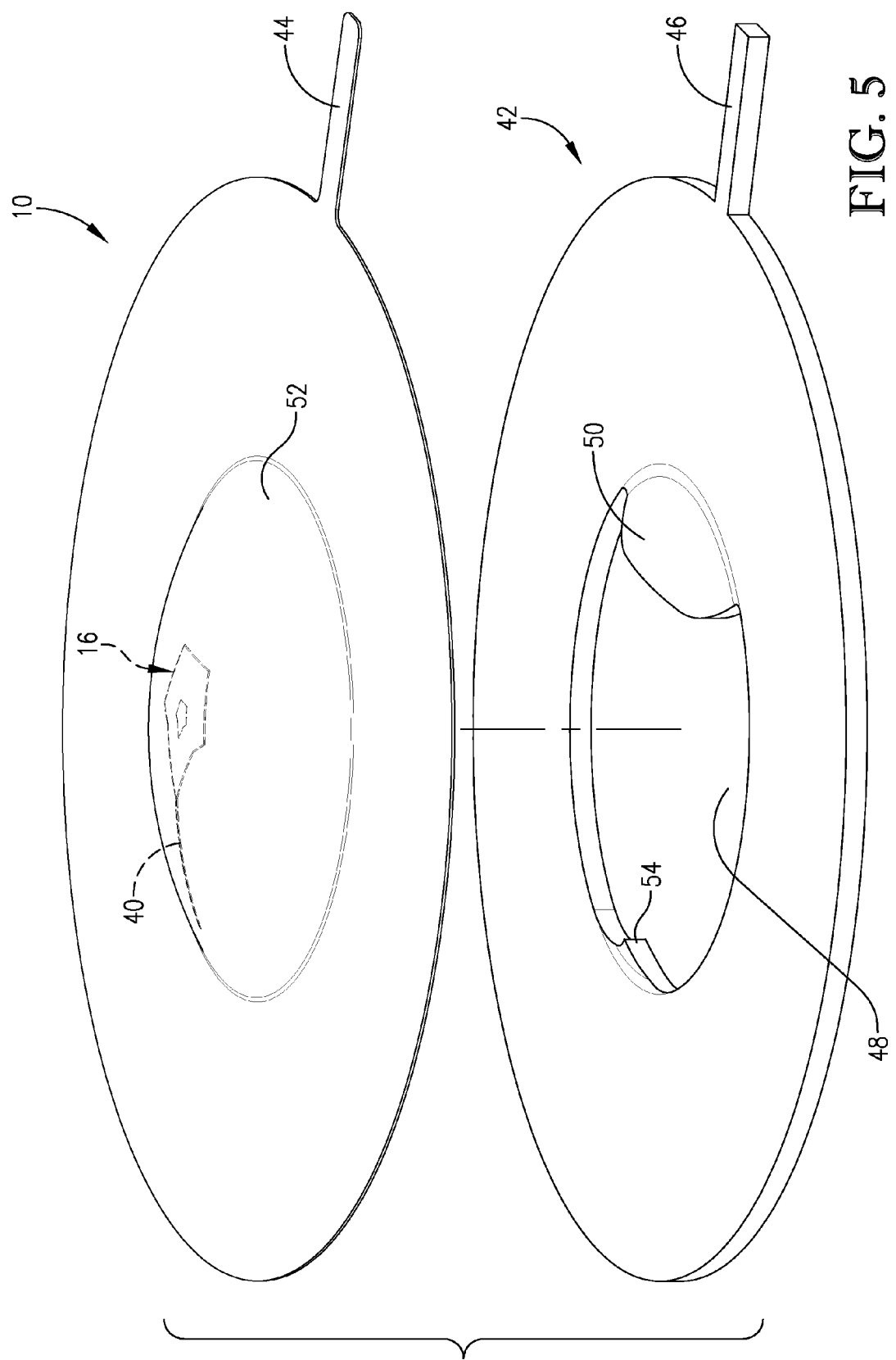
FIG. 5 is an isometric view of the rupture disc of FIG. 1 shown in conjunction with a rupture disc support ring.

A narrowed lased area, such as line of weakness 40, assists in guiding the reversal of bulged section 12 that began within reversal initiation feature 16 toward a specific point or area on bulged section 12. In particular embodiments, line of weakness 40 helps to direct reversal of bulged section 12 toward tooth 54 thereby ensuring opening of disc 10. Side margins 32 and 34 of reversal initiation feature 16 (as well as corresponding segments 32a, 34a of feature 16a, and 32b, 34b of feature 16b of the embodiments illustrated in FIGS. 8 and 9, respectively) converge toward line of weakness 40 thereby focusing the forces generated by reversal of bulged section 12 on line of weakness 40. While reversal initiation feature 16 and line of weakness 40 are shown in FIG. 5 as being longitudinally aligned with tab 46 and tooth 54 it is within the scope of the present invention for feature 16 and line 40 to be skewed relative to this longitudinal axis such that disc reversal is directed toward any point on bulged section 12 adjacent flange 14.

In certain embodiments, although it may affect the structural integrity of bulged section 12, line of weakness 40 may be, but is not necessarily, determinative of the pressure required to initiate reversal of bulged section 12. This characteristic is primarily controlled by reversal initiation feature 16, and line of weakness 40 primarily directs the progression of disc reversal. In some embodiments, line of weakness 40 has a depth that is no greater than the depth of first lased area 22, and may be of a depth less than that of first lased area 22, but this need not always be the case. In alternate embodiments, line of weakness 40 may have a greater depth near the periphery of bulged section 12, where the metal is likely to be thicker, than the first lased area 22. The depth of line of weakness 40 would then decrease nearer to the apex of bulged section 12, where the metal is likely to be thinner. By varying the depth of the line of weakness in this manner, line of weakness 40 can be fully exploited to both take up excess energy in high-energy opening events, thereby eliminating fragmentation, and in low-energy opening events to form a crease after opening which eliminates the "cup" and diminished flow values discussed previously. The formation of this crease is illustrated in FIG. 10, and discussed below.

Figure 6:
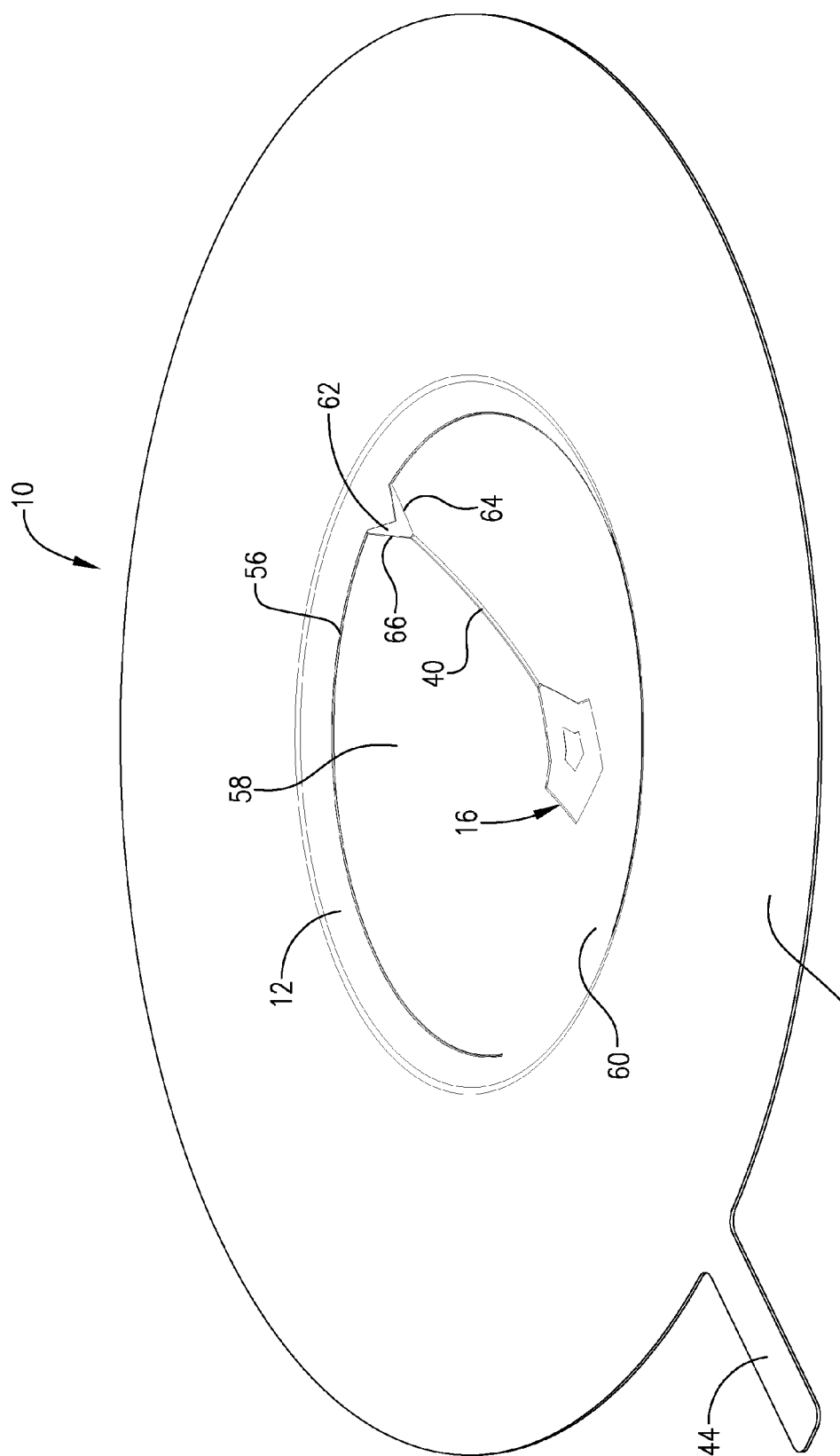
FIG. 6 is an isometric view of an alternate embodiment of a rupture disc according to the present invention, the rupture disc having a line-of-opening recess formed in the concave portion of the disc.

As shown in FIG. 6, bulged section 12 may also be provided with a line-of-opening recess 56 that defines an area of disc opening 58. In particular embodiments, line-of-opening recess 56 is C-shaped and has ends that define a hinge region 60, although it is within the scope of the present invention for line-of-opening recess 56 to comprise other shapes and configurations. As bulged section 12 reverses concavity, the disc material tears along line-of-opening recess 56 and the disc opens. Disc 10 is configured so that opening area 58 remains attached to disc 10 at hinge region 60.

Figure 7:
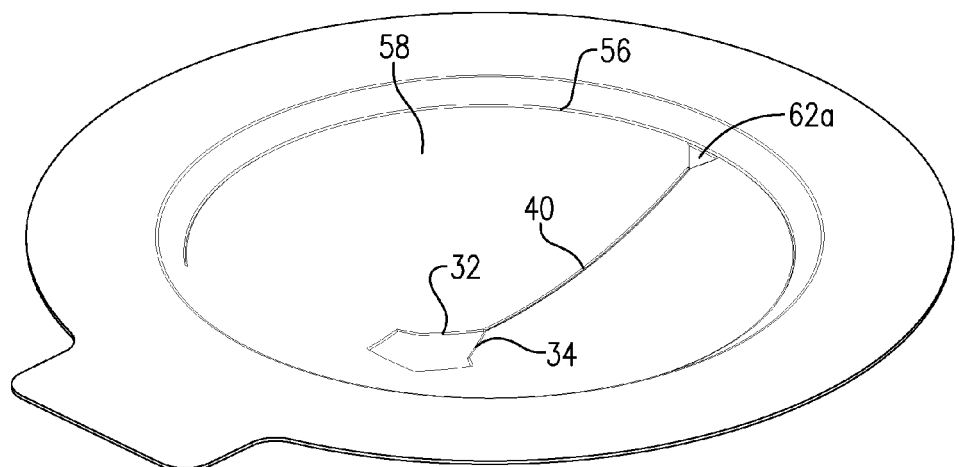
FIG. 7 is an isometric view of an alternate embodiment of a rupture disc according to the present invention, the rupture disc having a triangular-shaped transition region interconnecting the line of weakness and line-of-opening recess.

In some embodiments, line of weakness 40 extends between and interconnects reversal initiation feature 16 and line-of-opening recess 56. Line-of-opening recess 56 does not control the burst pressure of disc 10, even though it may be of generally greater depth than first lased area 22. Recess 56 generally sees less concentrated loading of forces, may be formed in a thicker region of the disc, and is more affected by the fixity provided by the mounting configuration of disc 10. Line of weakness 40 interconnects with said line-of-opening recess 56 via a transitional segment 62. In certain embodiments, such as depicted in FIG. 6, transitional segment 62 is defined at least in part by a pair of oblique side margins 64, 66, and has a generally dart-like shape. Transitional segment 62 is a lased area of bulged section near the disc periphery, and having a depth generally less than that of line-of-opening recess 56. Therefore, it too, does not affect the burst pressure of disc 10. FIGS. 7-9 depict an alternate transitional segment 62a that is similar to transitional segment 62 in that it is defined at least in part by a pair of oblique side margins, but is of substantially triangular configuration.

Figure 10:
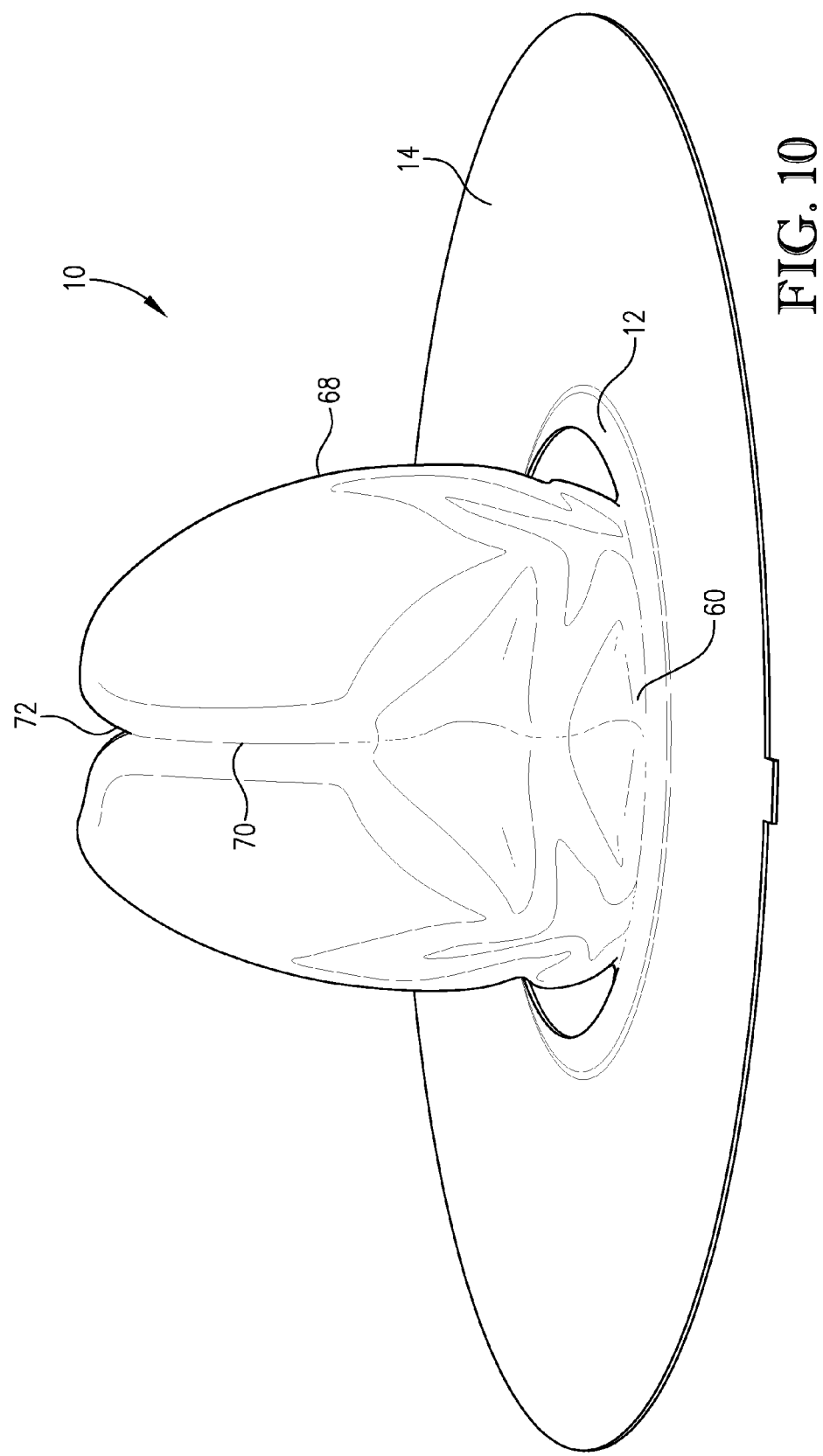
FIG. 10 is a view of a disc made in accordance with one embodiment of the present invention that has undergone reversal and rupture.

In FIG. 10, disc 10 is illustrated after reversal and opening of bulged section 12. A petal 68 has been formed by the tearing of bulged section 12 along line-of-opening recess 56 and folding of the petal about hinge region 60. A crease 70 in petal 68 has been formed along line of weakness 40. Further there has been some tearing of petal 68 along line of weakness 40 toward the center of the petal as evidenced by a V-shaped tear 72. Such a tear need not always accompany reversal and opening of disc 10. In some embodiments, there may not be any tearing of petal 68 along line of weakness 40, and in other embodiments, there will be significant tearing, which may approach the center of the petal.

It is within the scope of the present invention for significant portions of the disc surface to be milled with the laser so as to reduce the thickness of bulged section 12. The ability to remove material over large portions of the surface of bulged section 12 permits greater control over disc opening characteristics. For example, laser machining of significant portions of either concave face 18 or convex face 20, or both, permits the manufacture of rupture discs from a common stock material that have a greater range of burst pressures.

In certain embodiments, at least one of concave face 18 or convex face 20 undergoes laser milling to form a lased area having an area that occupies at least 75%, at least 85%, or at least 90% of the total surface area of that particular face. At the extreme, all or substantially all of the surface of the dome may be milled to at least some extent, and the lased area may even extend onto portions of flange 14. Exemplary embodiments of these types of milled domes are illustrated in FIGS. 11 and 12.

Turning first to FIG. 11, a rupture disc 10a is depicted in which substantially the entire convex face 20a has been laser milled in order to reduce the thickness of bulged section 12a and create a lased area 22a. The reduced thickness of bulged section 12a can be seen by direct comparison with outer flange section 14. In this particular embodiment, lased area 22a extends past the transition zone 23 (i.e., the region which joins bulged section 12a and flange section 14) and onto at least a portion of flange section 14. However, this need not always be the case.

Turning to FIG. 12, a rupture disc 10b is depicted in which substantially the entire concave face 18b has been milled with a laser in order to reduce the thickness of bulged section 12b and create a lased area 22b. As depicted, disc 10b is substantially similar to disc 10a, with the exception that the milling operation has been performed on the concave face as opposed to the convex face, and the dimensional configuration options for lased area 22b are substantially the same as those discussed above with respect to lased area 22a. In certain embodiments where disc 10b includes a line-of-opening recess formed in bulged section 12b (e.g., a "C-shaped" line-of-opening recess), lased area 22b may occupy substantially the entire area of face 18b inboard of the line-of-opening recess.

It is further noted that lased features in addition to a line-of-opening recess 56, including reversal initiation feature 16 and line of weakness 40, may also be formed in rupture discs 10a or 10b. Moreover, these additional lased features may be formed in the same face that contains lased area 22a or 22b, or in the face opposite from lased area 22a or 22b. The lasing of significant portions of bulged section 12a or 12b is not limited to the manufacture of reverse-acting rupture discs, but may be employed in forward-acting discs as well.

We claim:

1. An over-pressure relief device comprising:
   a reverse-acting rupture disc including a central bulged section having a concave face and a convex face, and an outer flange section in surrounding relationship to said bulged section,
   said bulged section including a laser-defined reversal initiation feature that controls the pressure to which said rupture disc must be exposed in order to initiate reversal of the concavity of said bulged section and defines a location on said bulged section at which reversal of the concavity thereof begins upon exposure to said pressure,
   said reversal initiation feature being an ablated area located on said bulged section that has been subjected to an ablation operation in which the thickness of said bulged section has been reduced by the ablation of disc material therefrom and having a thickness that is less than the thickness of the bulged section surrounding said ablated area,
   said ablated area including a first ablated portion and a second ablated portion, said first and second portions being located within the same face of said central bulged section, said second ablated portion having a depth that is greater than the depth of said first ablated portion, at least part of said second ablated portion being located within the margins of said first ablated portion.

2. The device according to claim 1, wherein said reversal initiation feature is formed in said concave face of said rupture disc.

3. The device according to claim 1, wherein said bulged section further includes a lased line of weakness extending from said ablated area toward said flange section.

4. The device according to claim 3, wherein said line of weakness is configured to direct reversal of said bulged section from said reversal initiation feature toward a region of disc opening initiation on said bulged section.

5. The device according to claim 1, wherein said bulged section includes a line-of-opening recess that defines an opening area for said bulged section.

6. The device according to claim 5, wherein said line-of-opening recess is generally C-shaped and presents a pair of opposed ends that define a hinge region of said rupture disc.

7. The device according to claim 5, wherein said bulged section includes a line of weakness that extends between said ablated area and said line-of-opening recess.

8. The device according to claim 7, wherein said line-of-opening recess interconnects with said line of weakness via a transitional segment.

9. The device according to claim 8, wherein said transitional segment is of substantially triangular configuration and defined at least in part by a pair of oblique side margins.

10. The device according to claim 5, wherein said line-of-opening recess has a depth that is less than the depth of said second ablated portion.

11. The device according to claim 1, wherein said ablated area is of polygonal shape.

12. The device according to claim 1, wherein said ablated area is of non-polygonal shape.

13. The device according to claim 1, wherein said first and second ablated portions are of substantially similar shape.

14. An over-pressure relief device comprising:
a single-petal, reverse-acting rupture disc including a central bulged section having a concave face and a convex face, and an outer flange section in surrounding relationship to said bulged section,
said bulged section including a laser-defined reversal initiation feature that controls the pressure to which said rupture disc must be exposed in order to initiate reversal of the concavity of said bulged section,
said reversal initiation feature comprising a lased area located on said bulged section having a thickness that is less than the thickness of the bulged section surrounding said lased area, said lased area having a geometric center that is offset from an apex of said bulged section,
said bulged section further including a single lased line of weakness that extends from said lased area toward said flange section,
said lased line of weakness and said lased area being located within the same face of said bulged section.

15. The device according to claim 14, wherein said reversal initiation feature is formed in said concave face of said rupture disc.

16. The device according to claim 14, wherein said lased area comprises a first lased portion in surrounding relationship to a second lased portion, said second lased portion having a depth greater than the depth of said first lased portion.

17. The device according to claim 16, wherein said first and second lased portions are of substantially similar shape.

18. The device according to claim 14, wherein said lased area is of polygonal shape.

19. The device according to claim 14, wherein said lased area is of non-polygonal shape.

20. The device according to claim 14, wherein said line of weakness is configured to direct reversal of said bulged section from said reversal initiation feature toward a region of disc opening on said bulged section.

21. The device according to claim 14, wherein said bulged section includes a line-of-opening recess that defines an opening area for said bulged section.

22. The device according to claim 21, wherein said line-of-opening recess is generally C-shaped and presents a pair of opposed ends that define a hinge region of said rupture disc.

23. The device according to claim 22, wherein said line of weakness extends between said lased area and said line-of-opening recess.

24. The device according to claim 23, wherein said line-of-opening recess interconnects with said line of weakness via a transitional segment.

25. The device according to claim 24, wherein said transitional segment is of substantially triangular configuration and defined at least in part by a pair of oblique side margins.

26. The device according to claim 14, wherein said lased area has a geometric center that is offset from the apex of the bulged section.

27. An over-pressure relief device comprising:
a rupture disc formed from a disc material and including a central bulged section, having a concave face and a convex face, and an outer flange section in surrounding relationship to said bulged section,
at least one of said concave and convex faces having been subjected to a laser milling operation in which the thickness of at least 75% of the total surface area of said at least one face has been reduced by the ablation of disc material therefrom to form a contiguous ablated area.

28. The over-pressure relief device according to claim 27, wherein said ablated area occupies substantially all of the surface area of said at least one face.

29. The over-pressure relief device according to claim 27, wherein said ablated area extends onto at least a portion of said outer flange section.

30. The over-pressure relief device according to claim 27, wherein said bulged section includes a C-shaped line-of-opening recess formed therein, said ablated area occupying substantially the entire area of said at least one face inboard of said line-of-opening recess.

31. The over-pressure relief device according to claim 27, wherein said rupture disc is a reverse-acting rupture disc.

32. The over-pressure relief device according to claim 31, wherein said rupture disc comprises a reversal initiation feature formed in said bulged section that controls the pressure to which said rupture disc must be exposed in order to initiate reversal of the concavity of said bulged section.

33. The over-pressure relief device according to claim 32, wherein said reversal initiation feature is formed within said ablated area.

34. The over-pressure relief device according to claim 32, wherein said ablated area is formed in only one of said concave and convex faces, and said reversal initiation feature is formed in the opposite face from said ablated area.

35. The over-pressure relief device according to claim 27, wherein said ablated area includes a first ablated portion and a second ablated portion, said first and second portions being located within the same face of said central bulged section, said second ablated portion having a depth that is greater than the depth of said first ablated portion, said second ablated portion being located within the margins of said first ablated portion.

36. A process for manufacturing an over-pressure relief device comprising the steps of:
providing a rupture disc formed from a disc material having a bulged section and an outer flange section, said bulged section including opposed convex and concave faces;
passing a laser beam over at least one of said convex and concave faces thereby reducing the thickness of at least 75% of the total surface area of said at least one face by the ablation of disc material therefrom and forming a contiguous ablated area.

37. The process according to claim 36, wherein said rupture disc is a reverse-acting rupture disc.

38. The process according to claim 37, said process further comprising forming a reversal initiation feature in said bulged section that controls the pressure to which said rupture disc must be exposed in order to initiate reversal of the concavity of said bulged section.

39. The process according to claim 38, wherein said reversal initiation feature is formed within said ablated area.

40. The process according to claim 38, wherein said ablated area is formed in only one of said concave and convex faces, and said reversal initiation feature is formed in the opposite face from said ablated area.

41. The process according to claim 36, said process further including forming a line-of-opening recess in said bulged section, said ablated area occupying substantially the entire area of said at least one face inboard of said line-of-opening recess.

42. The process according to claim 36, wherein said step of passing a laser beam over at least one of said convex and concave faces comprises ablating a first portion of disc material within said ablated area to a first depth and ablating a second portion of disc material within said ablated area to a second depth that is greater than the depth of said first portion, said second portion of disc material being located within the margins of said first portion of disc material.

43. An over-pressure relief device comprising:
a reverse-acting rupture disc including a central bulged section having a concave face and a convex face, and an outer flange section in surrounding relationship to said bulged section,
said bulged section including a laser-defined reversal initiation feature that controls the pressure to which said rupture disc must be exposed in order to initiate reversal of the concavity of said bulged section,
said reversal initiation feature comprising a lased area located on said bulged section having a thickness that is less than the thickness of the bulged section surrounding said lased area,
said lased area including a first lased portion and a second lased portion, said second lased portion having a depth that is greater than the depth of said first lased portion,
said bulged section including a line-of-opening recess that defines an opening area for said bulged section,
said bulged section including a line of weakness that extends between said first lased area and said line-of-opening recess.

44. The device according to claim 43, wherein said line-of-opening recess interconnects with said line of weakness via a transitional segment.

45. The device according to claim 44, wherein said transitional segment is of substantially triangular configuration and defined at least in part by a pair of oblique side margins.

46. An over-pressure relief device comprising:
a reverse-acting rupture disc including a central bulged section having a concave face and a convex face, and an outer flange section in surrounding relationship to said bulged section,
said bulged section including a laser-defined reversal initiation feature that controls the pressure to which said rupture disc must be exposed in order to initiate reversal of the concavity of said bulged section,
said reversal initiation feature comprising a lased area located on said bulged section having a thickness that is less than the thickness of the bulged section surrounding said lased area,
said bulged section further including a lased line of weakness that extends from said lased area toward said flange section,
said bulged section including a line-of opening recess that defines an opening area for said bulged section, wherein said line-of-opening recess is generally C-shaped and presents a pair of opposed ends that define a hinge region of said rupture disc, said line of weakness extending between said lased area and said line-of-opening recess.

47. The device according to claim 46, wherein said line-of-opening recess interconnects with said line of weakness via a transitional segment.

48. The device according to claim 47, wherein said transitional segment is of substantially triangular configuration and defined at least in part by a pair of oblique side margins.

* * * * *